United States Patent
Ye

(10) Patent No.: US 11,505,280 B2
(45) Date of Patent: Nov. 22, 2022

(54) ELECTRIC BICYCLES

(71) Applicant: Avant Enterprises, Inc., Industry, CA (US)

(72) Inventor: Ying Ye, Chino Hills, CA (US)

(73) Assignee: Avant Enterprises, Inc., Industry, CA (US)

( * ) Notice: Subject to any disclaimer, the term of this patent is extended or adjusted under 35 U.S.C. 154(b) by 102 days.

(21) Appl. No.: 16/544,520

(22) Filed: Aug. 19, 2019

(65) Prior Publication Data

US 2020/0207442 A1    Jul. 2, 2020

(51) Int. Cl.
| | | |
|---|---|---|
| *B62M 6/90* | (2010.01) | |
| *B62M 6/40* | (2010.01) | |
| *B62J 45/00* | (2020.01) | |
| *B62J 50/20* | (2020.01) | |
| *B62J 99/00* | (2020.01) | |

(52) U.S. Cl.
CPC ............... *B62M 6/90* (2013.01); *B62J 99/00* (2013.01); *B62M 6/40* (2013.01); *B62J 45/00* (2020.02); *B62J 50/20* (2020.02)

(58) Field of Classification Search
CPC ... B62M 6/90; B62M 6/40; B62J 50/20; B62J 45/00
See application file for complete search history.

(56) References Cited

U.S. PATENT DOCUMENTS

| | | | | | |
|---|---|---|---|---|---|
| 5,237,263 | A | * | 8/1993 | Gannon .................... | B62M 6/75 323/288 |
| 5,491,390 | A | * | 2/1996 | McGreen ................. | B62M 6/45 180/221 |
| 5,758,736 | A | * | 6/1998 | Yamauchi ................ | B62M 6/55 180/220 |
| 5,845,727 | A | * | 12/1998 | Miyazawa ............... | B62M 6/55 180/206.4 |
| 5,915,493 | A | * | 6/1999 | Nakayama ............... | B62M 6/40 180/206.4 |
| 6,152,251 | A | * | 11/2000 | Nagai ..................... | B62K 11/04 180/206.4 |

(Continued)

FOREIGN PATENT DOCUMENTS

| | | |
|---|---|---|
| CN | 207346035 U | 5/2018 |
| DE | 102009046967 A1 | 5/2011 |

OTHER PUBLICATIONS

European search report from Application No. 19218503.1 dated Apr. 7, 2020, 11 pages.

(Continued)

*Primary Examiner* — Tony H Winner
*Assistant Examiner* — Michael R Stabley
(74) *Attorney, Agent, or Firm* — Weisun Rao; Jun Chen; Venture Partner, LLC

(57) ABSTRACT

Among others, the present invention provides electric bicycles each including a body frame; a front wheel and a rear wheel; an electric motor configured to provide a mechanical power to at least one of the front and rear wheels; and a battery box configured to removably receive and hold one or more lithium battery packs. The one or more lithium battery packs are configured to power the electric bicycle, and at least one lithium battery pack is capable of being used as a power supply of a separate lithium electric tool.

21 Claims, 19 Drawing Sheets

(56) References Cited

U.S. PATENT DOCUMENTS

| | | | | |
|---|---|---|---|---|
| RE37,583 E * | 3/2002 | Mayer | ............... | B62M 6/60 |
| | | | | 180/206.1 |
| 6,836,037 B1 * | 12/2004 | Tsuboi | ............... | B62M 6/45 |
| | | | | 180/65.8 |
| 7,314,109 B2 * | 1/2008 | Holland | ............... | B62M 6/60 |
| | | | | 180/206.7 |
| 8,408,349 B1 * | 4/2013 | Vollmer | ............... | B62K 3/04 |
| | | | | 180/207.3 |
| 8,708,084 B2 * | 4/2014 | Kuroki | ............... | B62M 6/70 |
| | | | | 180/206.1 |
| 9,282,695 B2 | 3/2016 | Goto | | |
| 9,315,231 B2 * | 4/2016 | Gingl | ............... | B62M 6/55 |
| 9,434,447 B2 * | 9/2016 | Silva | ............... | B62M 6/55 |
| 9,616,966 B2 * | 4/2017 | Talavasek | ............... | B62K 19/34 |
| 9,915,302 B2 * | 3/2018 | Usami | ............... | B62K 25/286 |
| 10,661,858 B2 * | 5/2020 | Mano | ............... | B62M 6/55 |
| 2010/0051373 A1 * | 3/2010 | Lee | ............... | B62M 6/55 |
| | | | | 180/206.4 |
| 2011/0272203 A1 * | 11/2011 | Sugimoto | ............... | B60K 1/04 |
| | | | | 180/206.1 |
| 2012/0247854 A1 * | 10/2012 | Kyoden | ............... | B62J 3/12 |
| | | | | 180/206.4 |
| 2013/0068549 A1 * | 3/2013 | Laprade | ............... | B62M 6/55 |
| | | | | 180/206.1 |
| 2016/0052594 A1 * | 2/2016 | Kimmich | ............... | B62M 9/122 |
| | | | | 701/22 |
| 2019/0291810 A1 * | 9/2019 | Slaoui | ............... | B62M 6/90 |

OTHER PUBLICATIONS

Anonymous: "Blair's E-Cruiser, using DeWalt cordless tool battery packs I electricbike.com", Jan. 25, 2017 (Jan. 25, 2017), XP055679124, Retrieved from the Internet: URL:https://www.electricbike.com/dewalt-cordless-battery-cruiser/ [retrieved on Mar. 24, 2020].

* cited by examiner

ELECTRIC BICYCLES

CROSS-REFERENCE TO RELATED APPLICATION

This application claims priority to Chinese Application No. 201822250261.5, filed on Dec. 29, 2018, the contents of which are incorporated herein by reference in their entirety.

BACKGROUND OF THE INVENTION

A battery powered electric bicycle is known in the art. Conventional electric bicycles include a specially designed battery with a fixed capacity. Typically, the storage battery or lithium battery for the conventional electric bicycle is integrally built-in, has a large size, and is inconvenient to be carried out. Such conventional batteries are usually incompatible with the power supply of other household electrical appliances or equipment.

Due to the drawbacks of the conventional electrical bicycles, there is a pressing need to find solutions to have an electric bicycle with new lithium battery pack, which is easy to be disassembled, charged, and carried; allows a user to choose a desired capacity for the battery pack based on the personal and practical needs; has a reduced cost for battery replacement and an improved compatibility; and with its battery pack and charger capable of being shared with other lithium electric tools.

SUMMARY OF THE INVENTION

The present invention in general relates to a novel type of electric bicycles with detachable or removable battery pack(s). The electric bicycle utilizes a battery box to removably receive and hold one or more lithium battery packs.

One aspect of this invention utilizes a battery pack that is originally intended to be used for common lithium electric tools (e.g., electric power or gardening tools), such that the battery pack is interchangeable between the electric bicycles of this invention and other lithium electric tools. Additionally, since such a battery pack does not require a special charger, the electric bicycles according to the present invention can share its battery pack(s) and the charger with other lithium electric tools.

Another aspect of this invention provides varies connections of the lithium battery packs (e.g., slide-type and insert-type battery packs) in the electric bicycles. As further described in this document, the present invention provides varies assemblies and locations of the battery box in the bicycles (e.g., being mounted to the rear rack, front rack, seat tube, top tube or down tube with preferred shape or location deigns).

A further aspect of the present invention provides a battery box (for holding detachable lithium battery packs) having an AC charging port and/or one or more USB output ports. As such, the battery pack(s) can be charging directly without taking out from bicycle, and/or can optionally become a power supply to charge another electric device via one of the USB output ports. Moreover, the USB output port may enable data output on the battery box. For example, the USB output port can also be used through connecting a cell phone for, e.g., battery gauge display, speed display, travel range display, software upgrade, etc.

Still a further aspect of this invention provides a battery box—which, as whole, is easily and securely removable from a receiver mounted on a rack or tube (e.g., the down tube, the top tube, or the seat tube) of the bicycle. Accordingly, the whole battery box can be quickly removable from the bicycle by a user, thereby being able to be used as a regular power bank.

In one aspect, the present invention provides an electric bicycle comprising: a body frame; a front wheel and a rear wheel; an electric motor configured to provide a mechanical power to at least one of the front and rear wheels; and a battery box configured to removably receive and hold one or more lithium battery packs. The one or more lithium battery packs may be configured to power the electric bicycle, and at least one lithium battery pack is capable of being used as a power supply of a separate lithium electric tool.

In some embodiments, the battery box is mounted onto the body frame by a receiver, and the receiver removably receives and secures the battery box as a whole. Accordingly, the whole battery box (which may include one or more USB output ports and/or A/C charging ports) can be removable from the bicycle and able to be used as a regular power bank. In some further embodiments, the receiver includes a lock mechanism to hold and lock the whole battery box.

In some embodiments, the battery pack is a slide-type battery pack. In some other embodiments, the battery pack is an insert-type battery pack.

In some embodiments, the body frame comprises a seat tube and a down tube, and the battery pack is mounted to the seat tube. For instance, the battery box may have a substantially trapezoid shape, to particularly fit the angle space between the seat tube and the down tube.

In some embodiments, the body frame comprises a down tube, and the battery box is mounted to the down tube. In some further embodiments, the battery box may be positioned along the bottom side of the down tube.

In some embodiments, the body frame comprises a top tube, and the battery box is mounted to the top tube. For instance, the battery box can be positioned along the bottom side of the top tube.

In some other embodiments, the body frame includes a front rack, and the battery box is mounted under the front rack.

Still in some other embodiments, the body frame includes a rear rack, and the battery box is mounted under the rear rack.

In some embodiments, the battery box comprises sockets for plugging the battery pack.

In some embodiments, the battery box further comprises a lock structure or mechanism to hold and lock the battery pack. In some embodiments, the battery box comprises a spring to facilitate a removal of the one or more battery packs.

In some embodiments, the electric bicycle further comprises a circuit for electrically connecting the battery packs to the electric motor. The circuit can be a series circuit and/or a parallel circuit.

In some embodiments, the electric bicycle includes a removable cover plate to cover the battery box.

In some embodiments, the electric bicycle includes an AC charging port, and/or one or more USB output ports.

In some embodiments, the USB output port is on the battery box. In some further embodiments, the USB output port is configured to connect the battery box to a computing device for data output and/or display.

As used herein, the term "or" is meant to include both "and" and "or." In other words, the term "or" may also be replaced with "and/or."

As used herein, the singular forms "a," "an" and "the" are intended to include the plural forms as well, unless the context clearly indicates otherwise.

As used herein, the spatially relative terms, such as "top", "bottom", "inside", "outside", "above", and "under" may be used herein for ease of description to describe one element or feature's relationship to another element(s) or feature(s) as illustrated in the figures. The terms are not intended to require the described elements or structures in a specific direction, and are not intended to limit the scope of this invention as such.

BRIEF DESCRIPTIONS OF THE FIGURES

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

Figure 2:
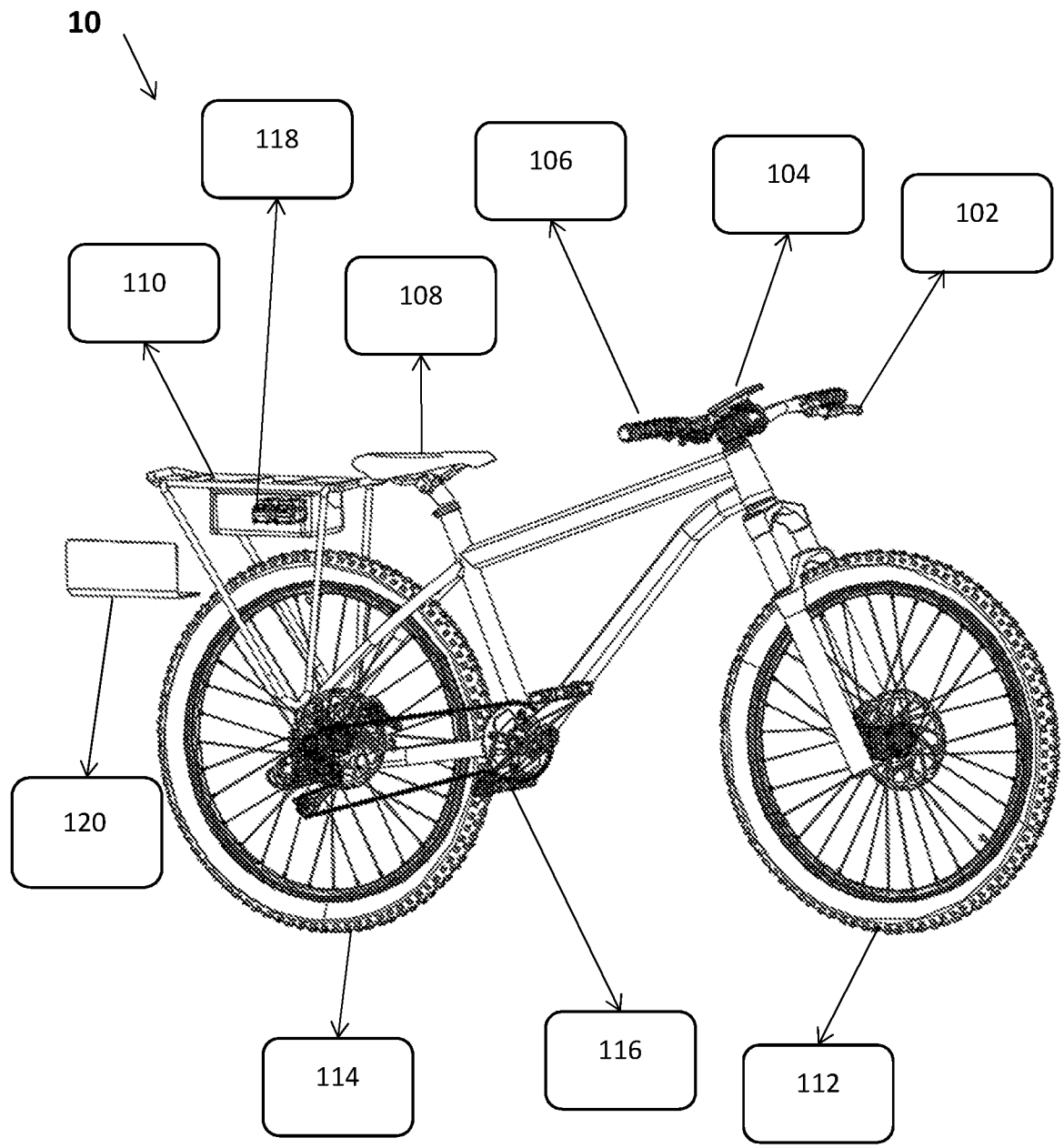
FIG. 2 is a perspective illustration of an electric bicycle of this invention, in which a battery box for holding one or more detachable battery packs is mounted to the rear rack of the bicycle.
Figure 3A:
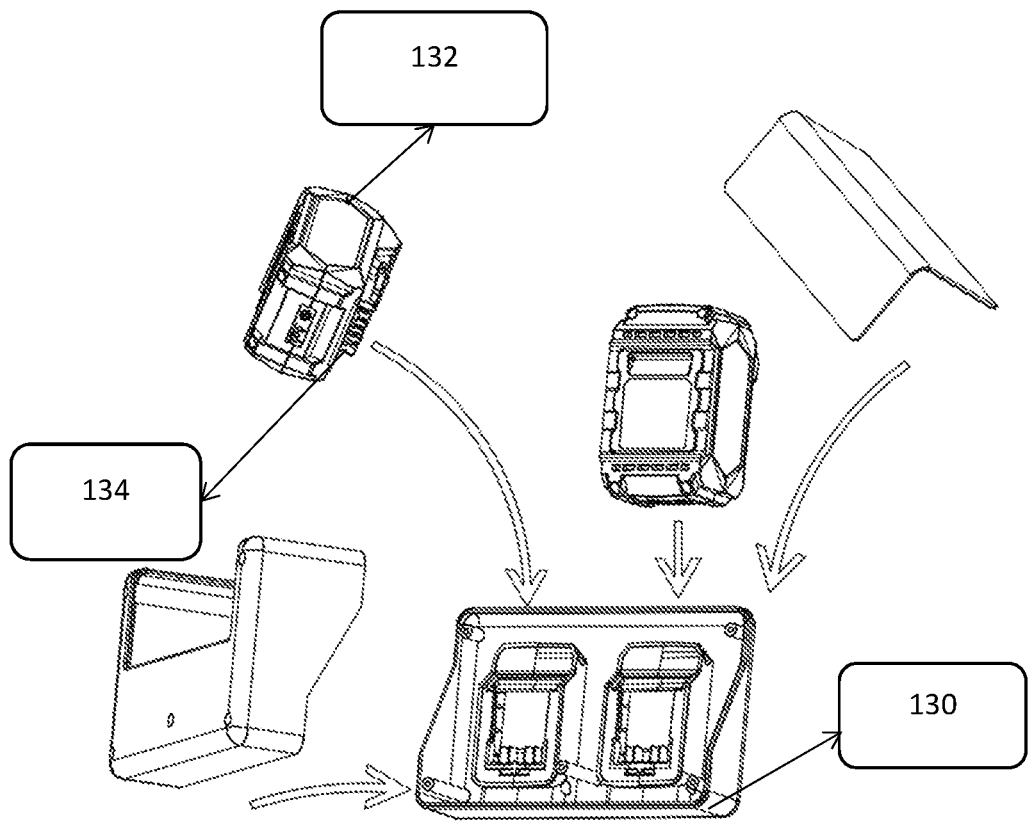
Figure 3B:
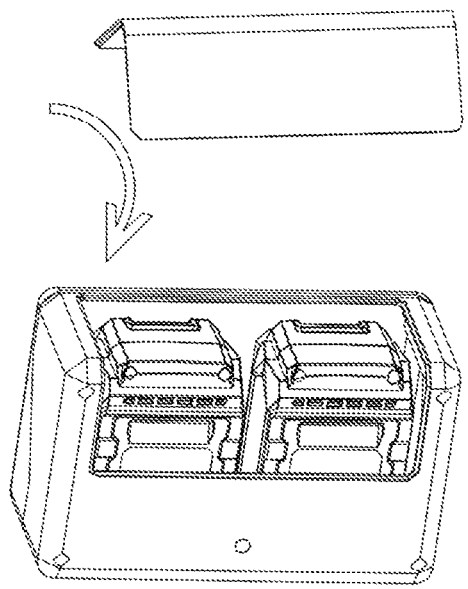

FIGS. 3A-3B provide perspective illustrations of an exemplary battery assembly, showing an electric bicycle of FIG. 2 with slide-type battery packs.

Figure 4A:
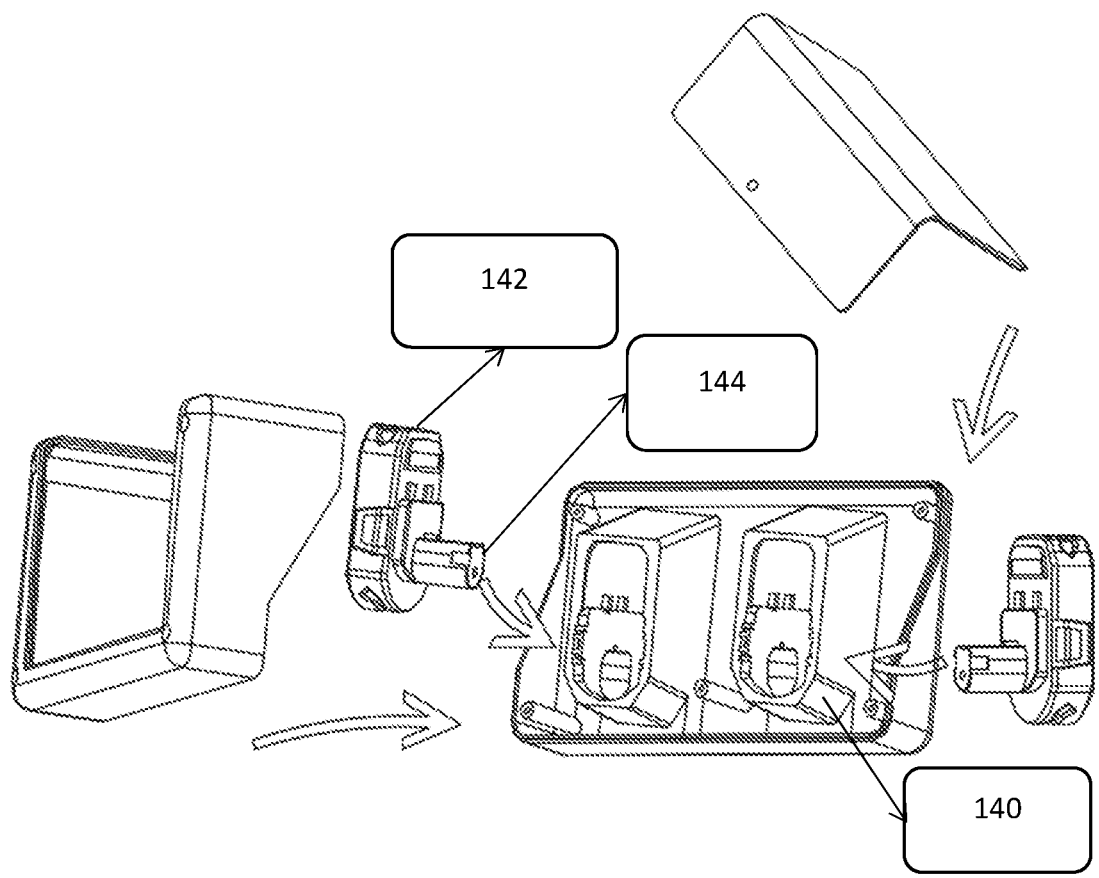
Figure 4B:
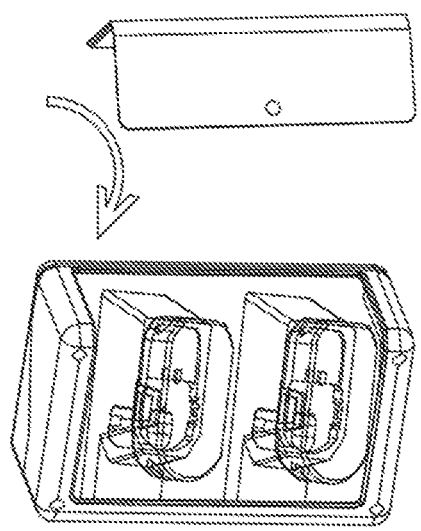

FIGS. 4A-4B provide perspective illustrations of an exemplary battery assembly, showing an electric bicycle of FIG. 2 with insert-type battery packs.

Figure 5:
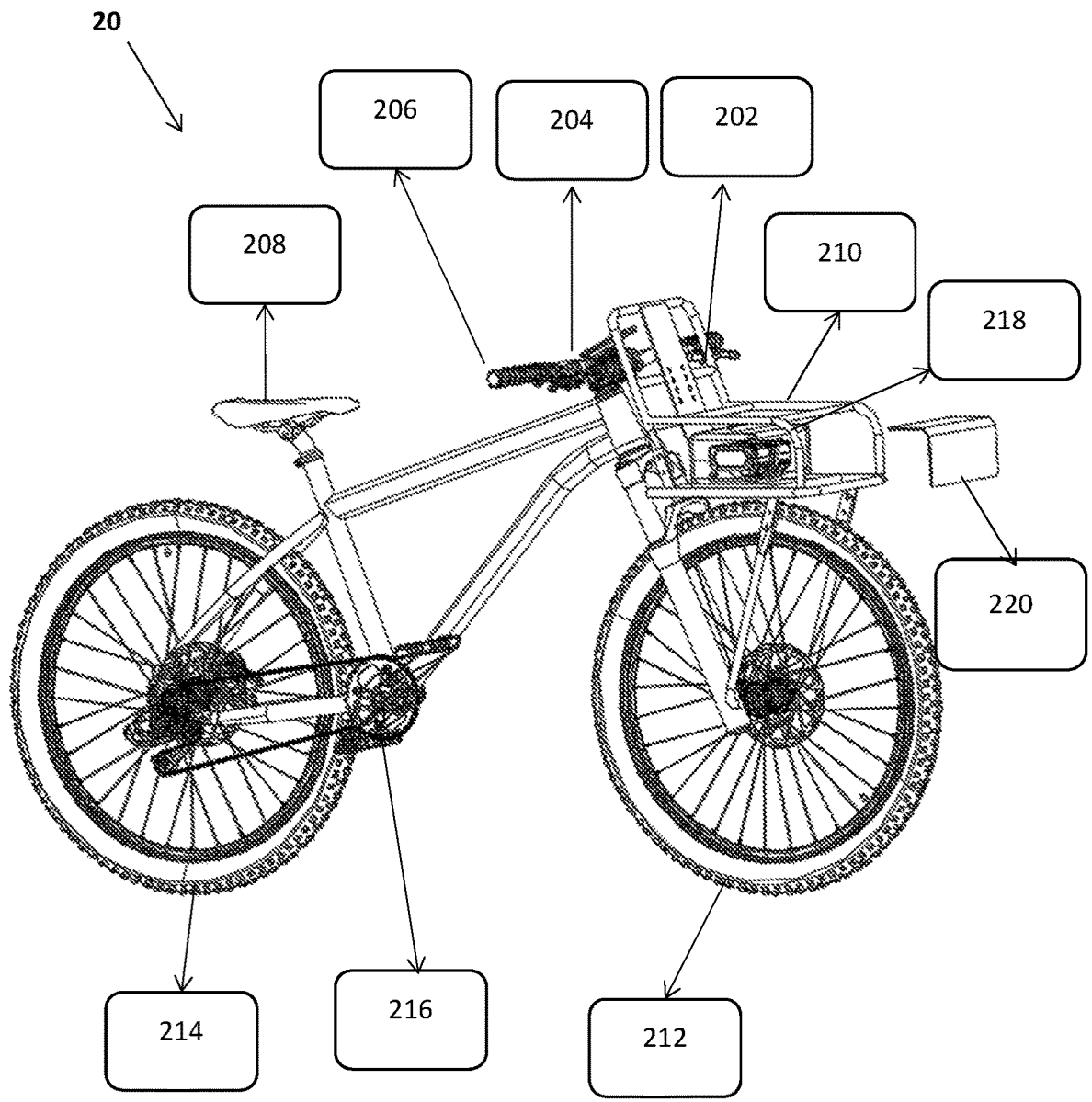

FIG. 5 is a perspective illustration of an electric bicycle of this invention, in which a battery box for holding one or more detachable battery packs is mounted to the front rack of the bicycle.

Figure 6A:
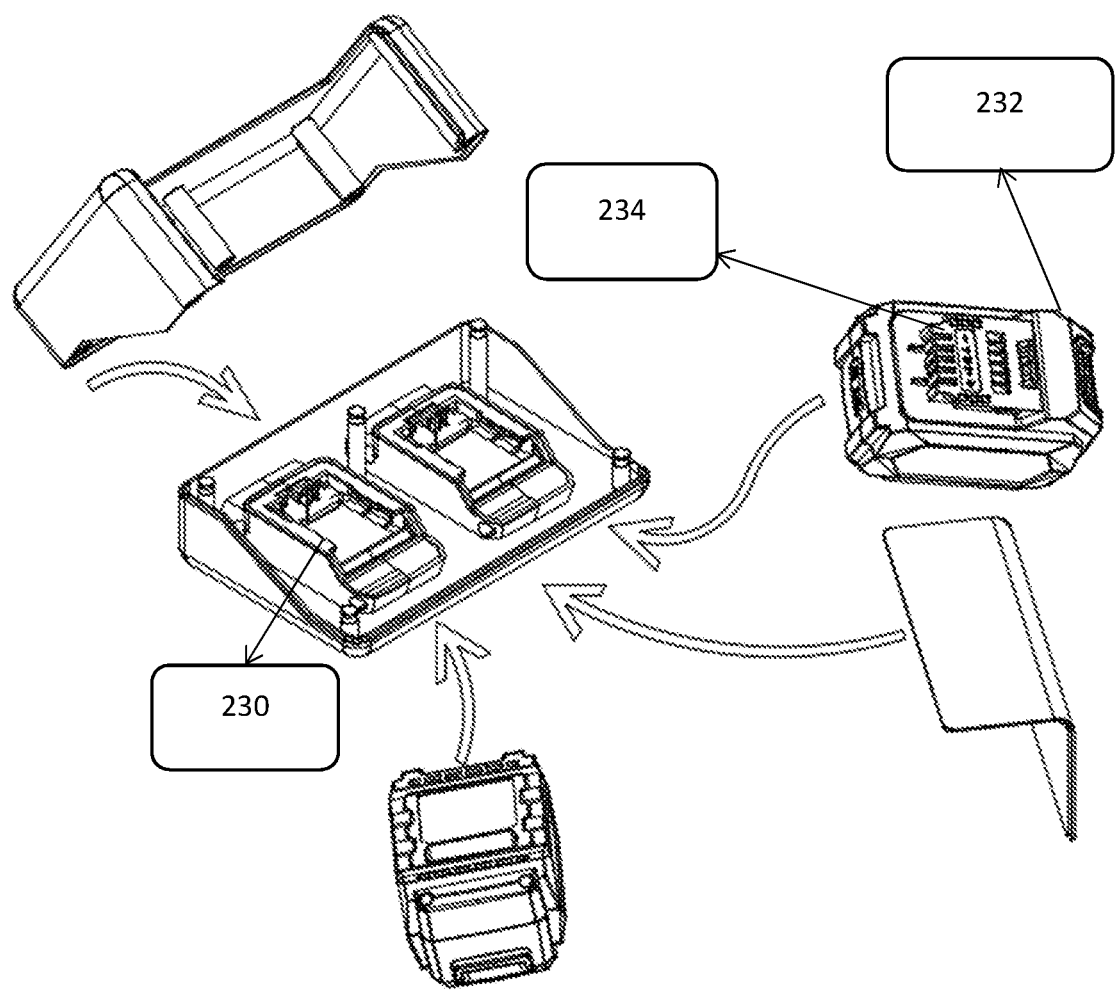
Figure 6B:
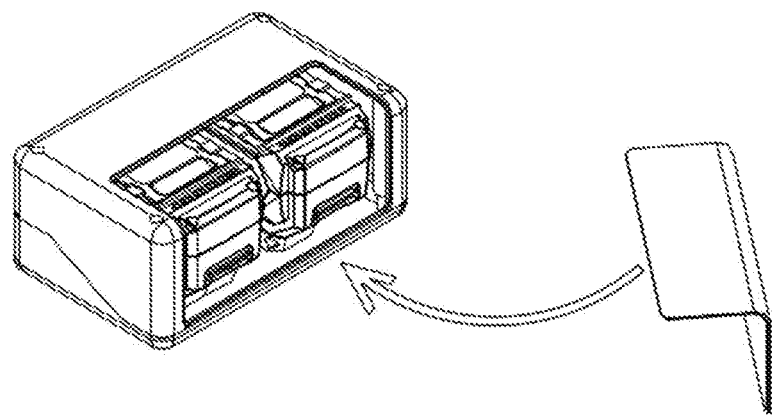

FIGS. 6A-6B provide perspective illustrations of an exemplary battery assembly, showing an electric bicycle of FIG. 5 with slide-type battery packs.

Figure 7A:
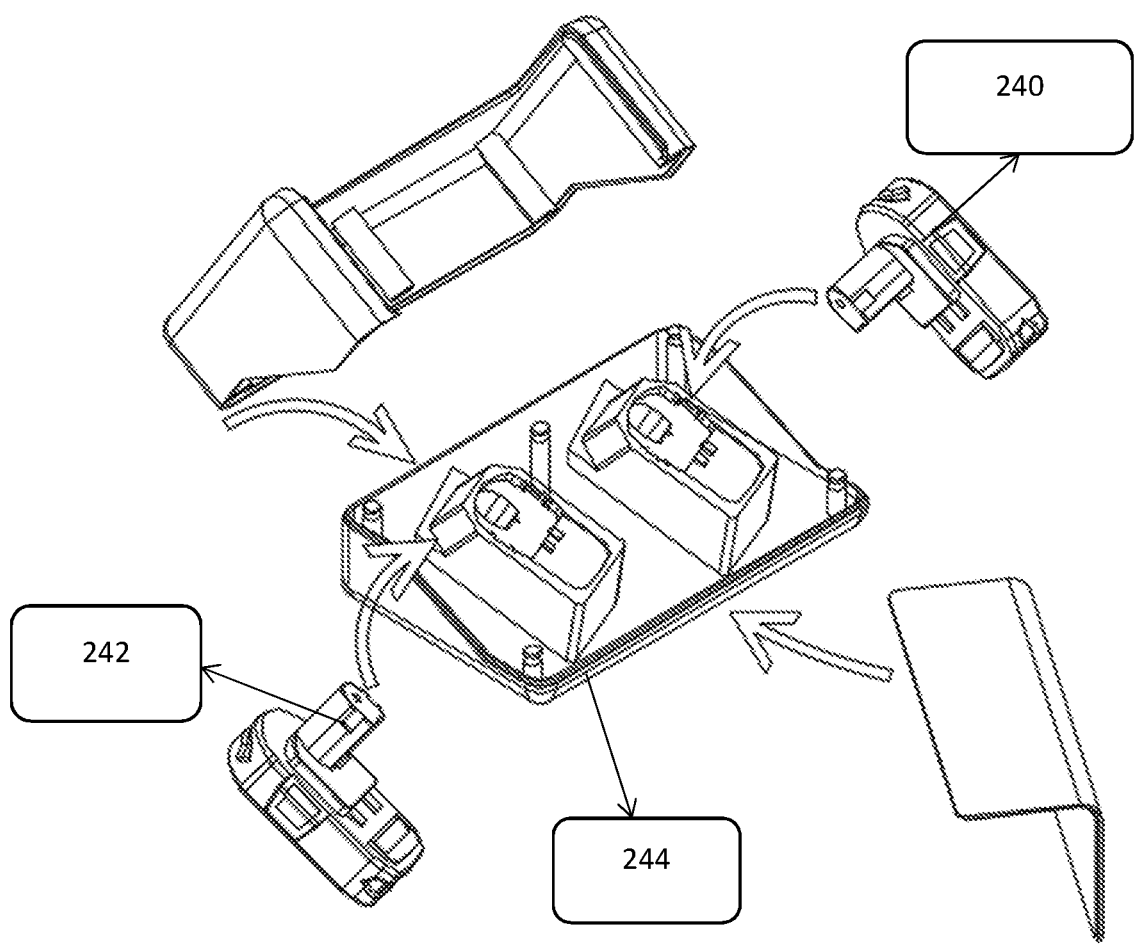
Figure 7B:
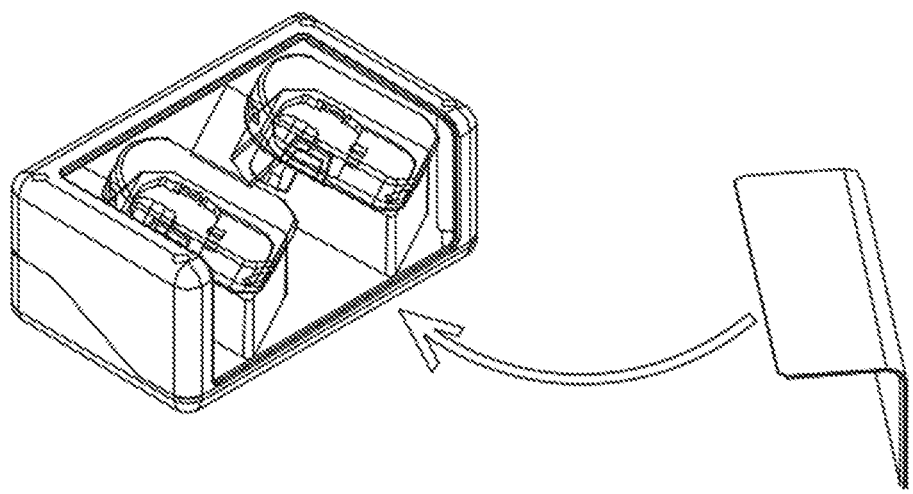

FIGS. 7A-7B provide perspective illustrations of an exemplary battery assembly, showing an electric bicycle of FIG. 5 with insert-type battery packs.

Figure 8:
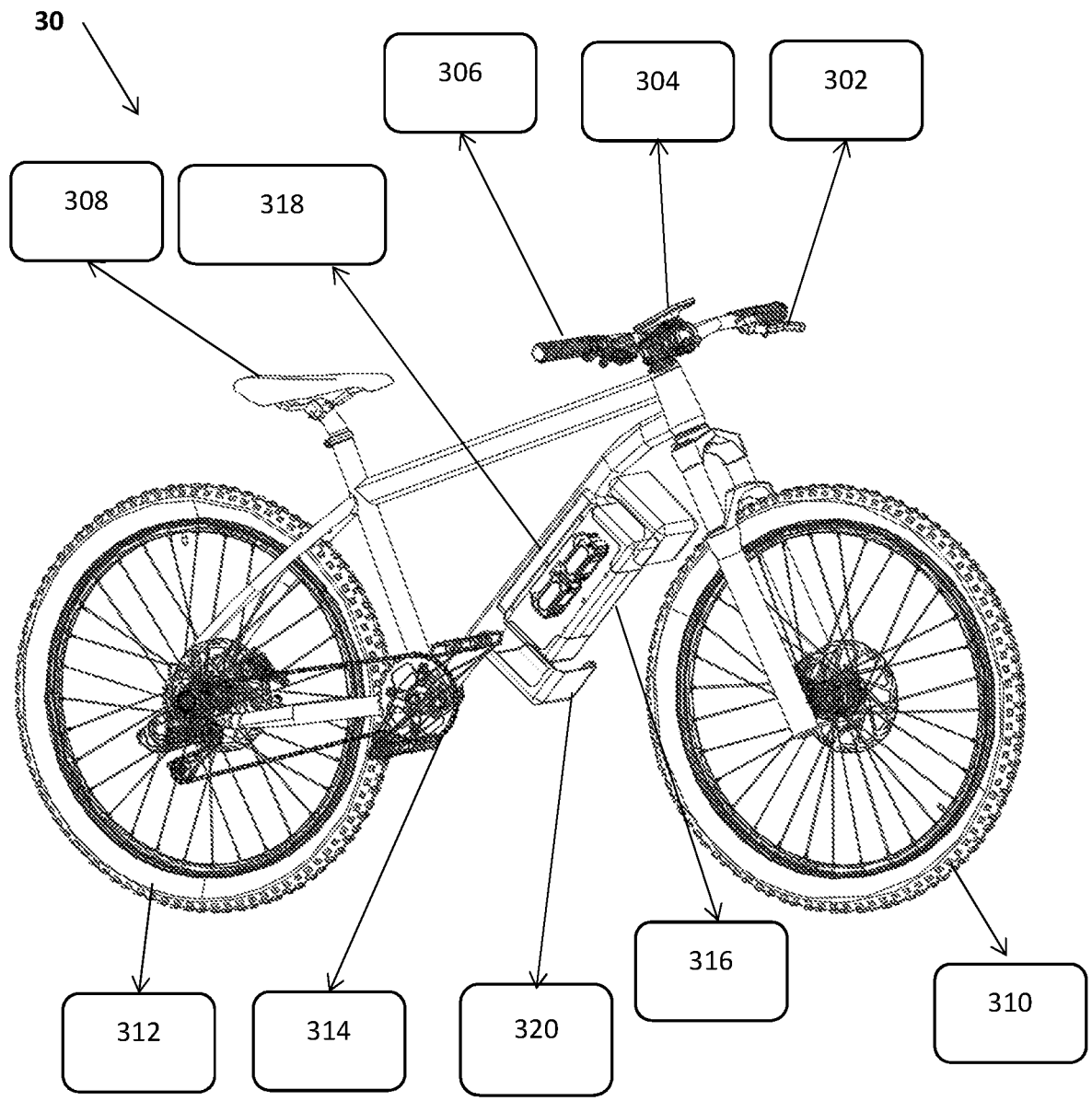

FIG. 8 is a perspective illustration of an electric bicycle of this invention, in which a battery box for holding one or more detachable battery packs is mounted to the down tube of the bicycle.

Figure 9A:
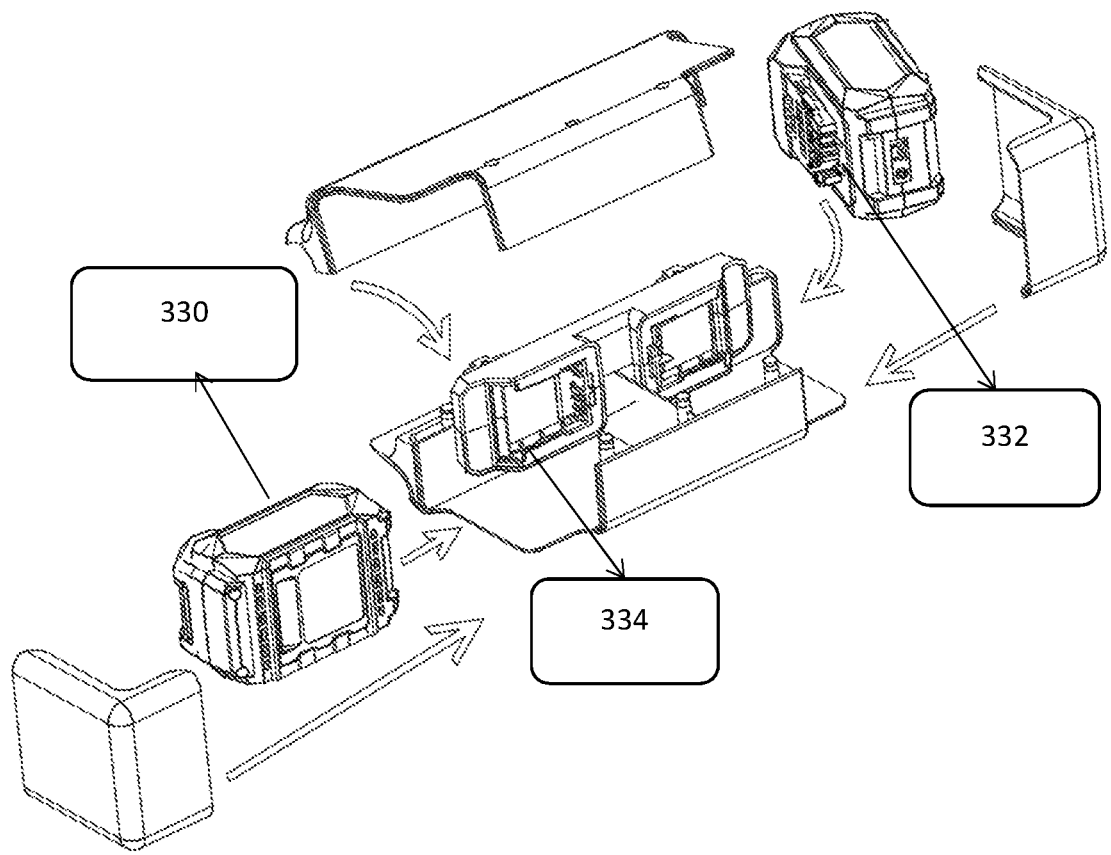
Figure 9B:
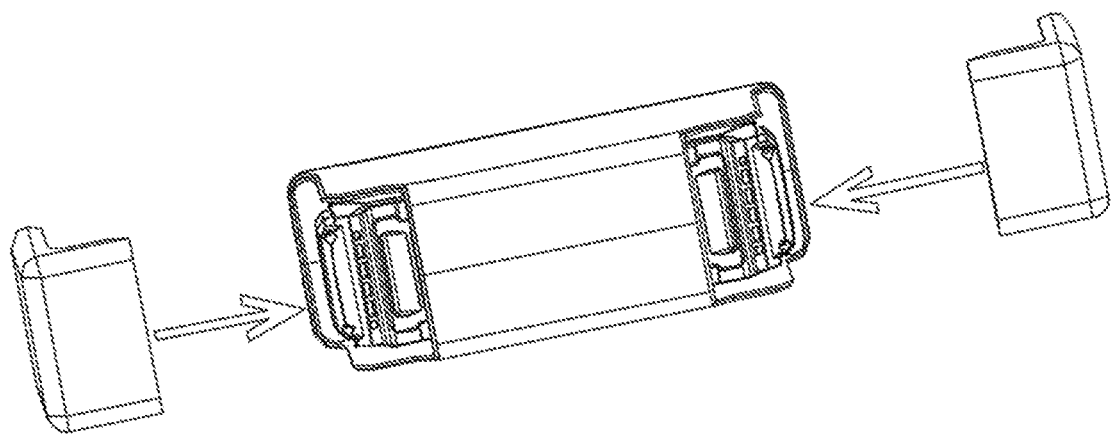

FIGS. 9A-9B provide perspective illustrations of an exemplary battery assembly, showing an electric bicycle of FIG. 8 with slide-type battery packs.

Figure 10A:
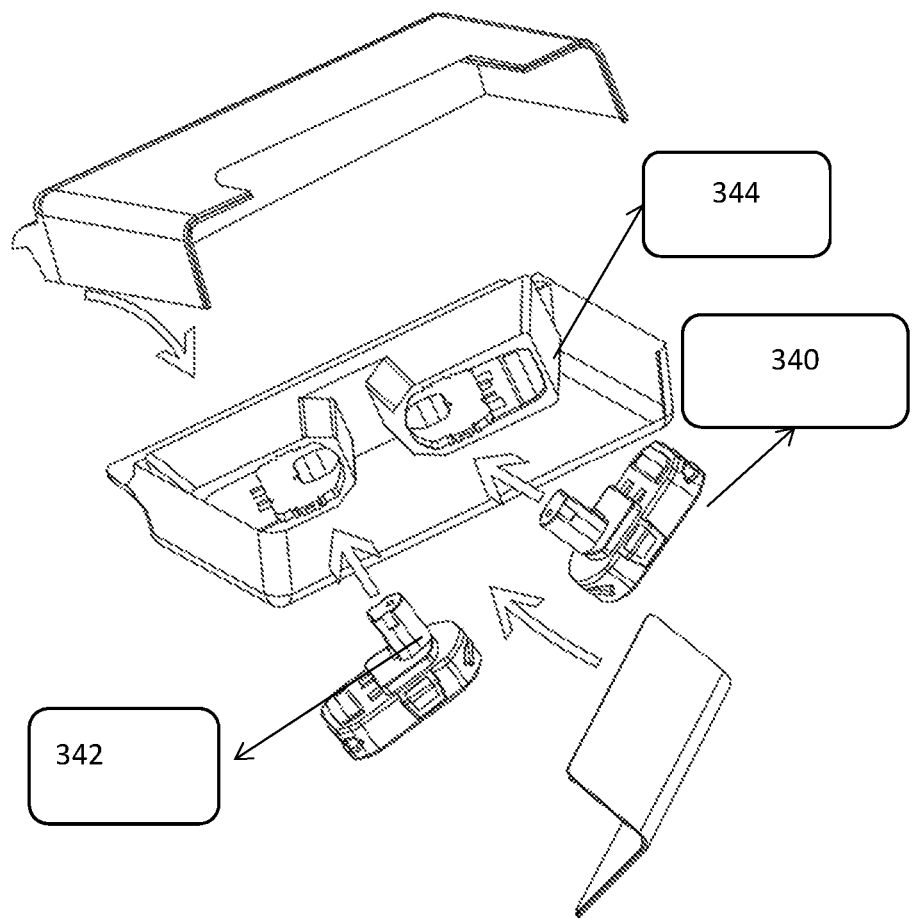
Figure 10B:
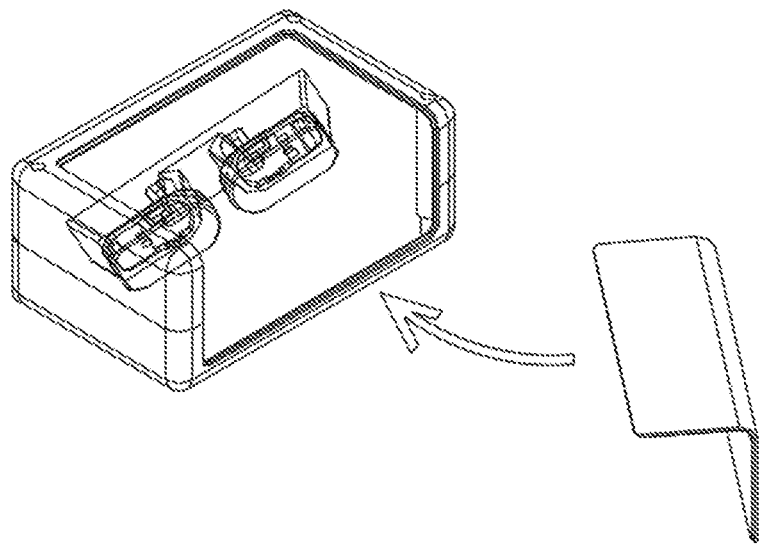

FIGS. 10A-10B provide perspective illustrations of an exemplary battery assembly, showing an electric bicycle of FIG. 8 with insert-type battery packs.

Figure 11:
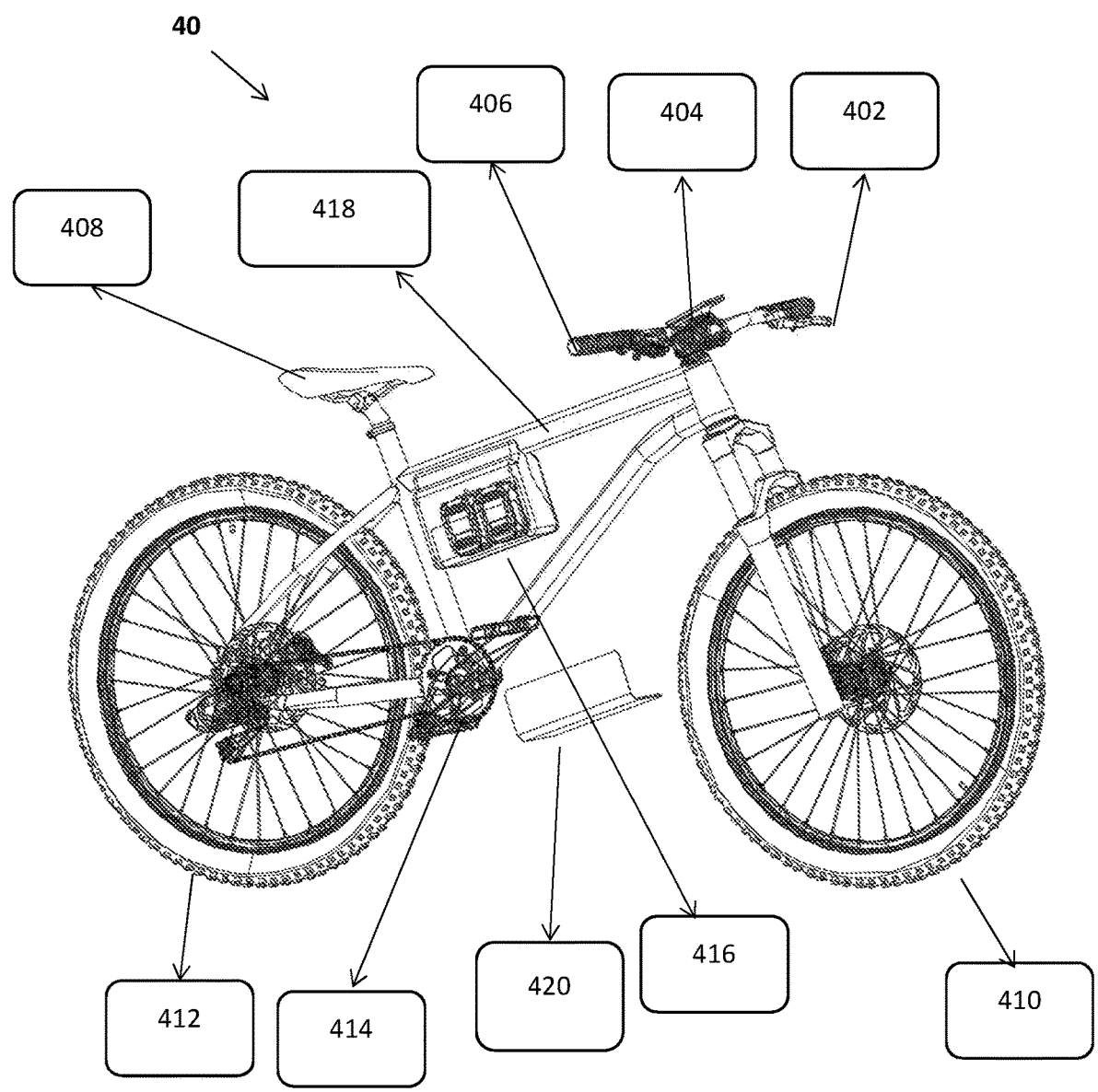

FIG. 11 is a perspective illustration of an electric bicycle of this invention, in which a battery box for holding one or more detachable battery packs is mounted to the top tube of the bicycle.

Figure 12A:
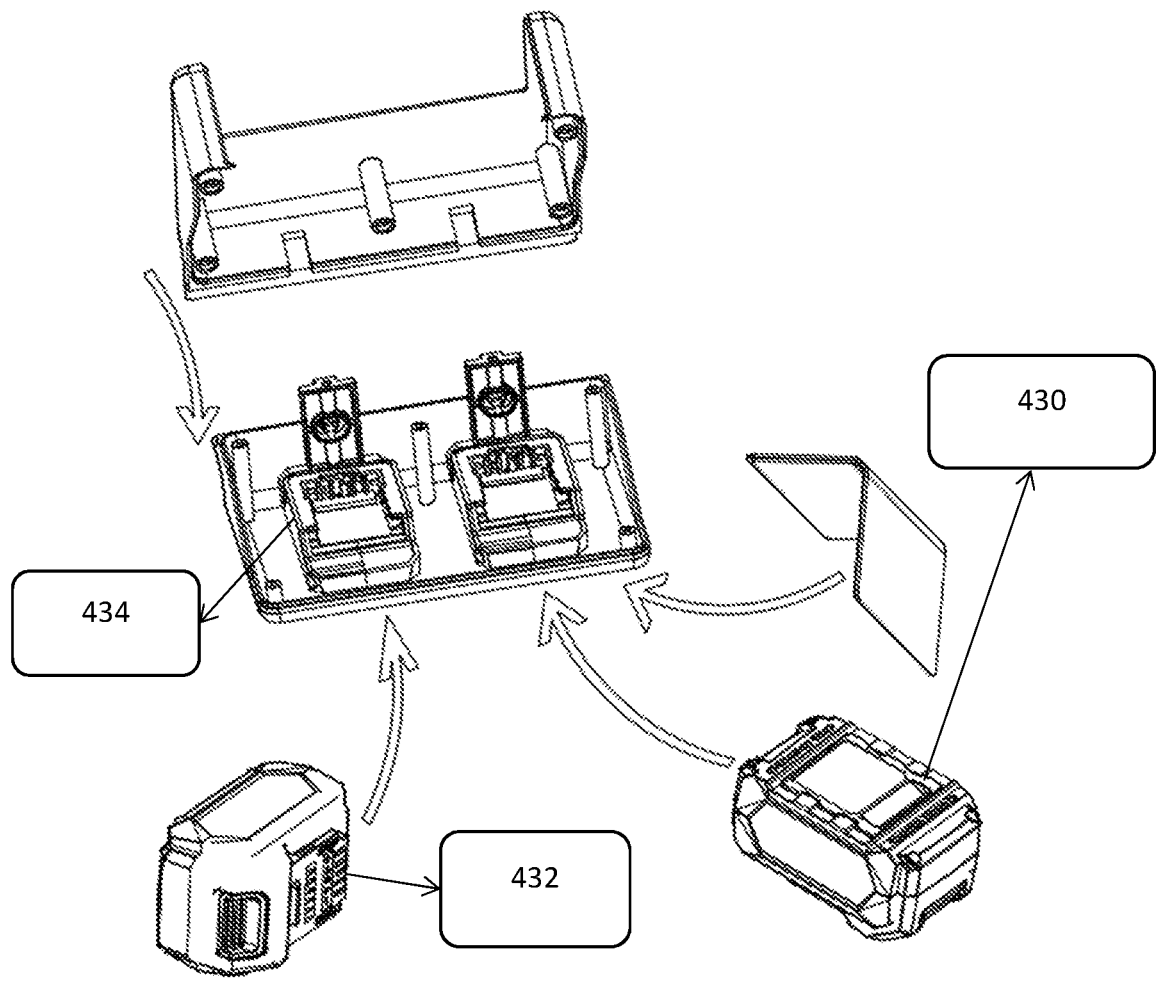
Figure 12B:
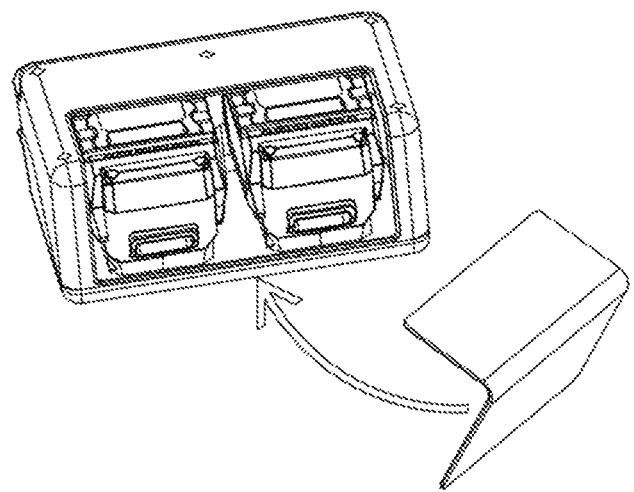

FIGS. 12A-12B provide perspective illustrations of an exemplary battery assembly, showing an electric bicycle of FIG. 11 with slide-type battery packs.

Figure 13A:
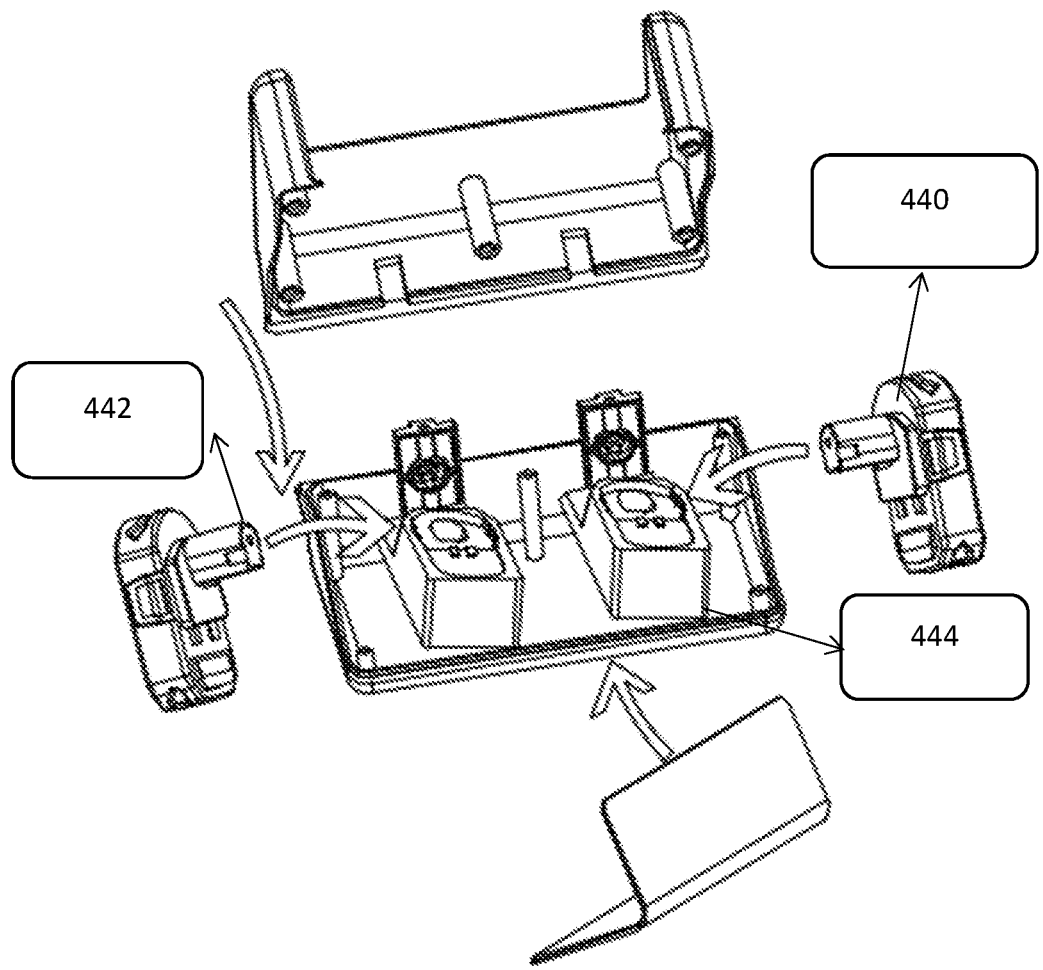
Figure 13B:
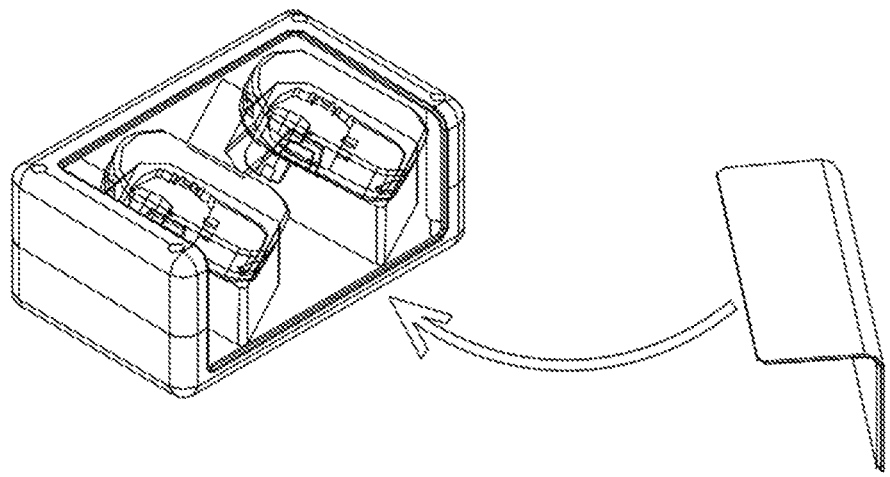

FIGS. 13A-13B provide perspective illustrations of an exemplary battery assembly, showing an electric bicycle of FIG. 11 with insert-type battery packs.

Figure 14:
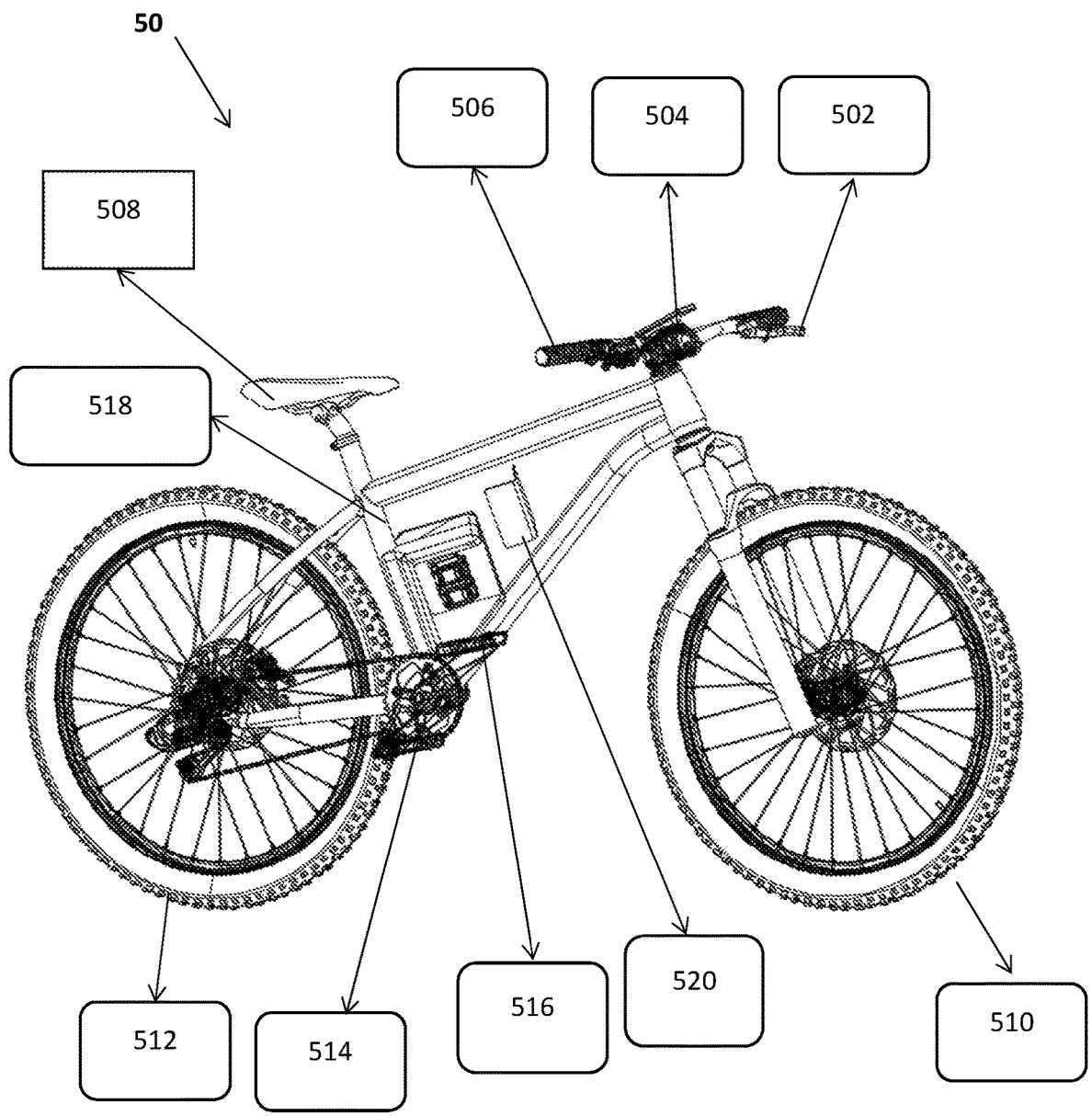

FIG. 14 is a perspective illustration of an electric bicycle of this invention, in which a battery box for holding one or more detachable battery packs is mounted to the seat tube of the bicycle.

Figure 15A:
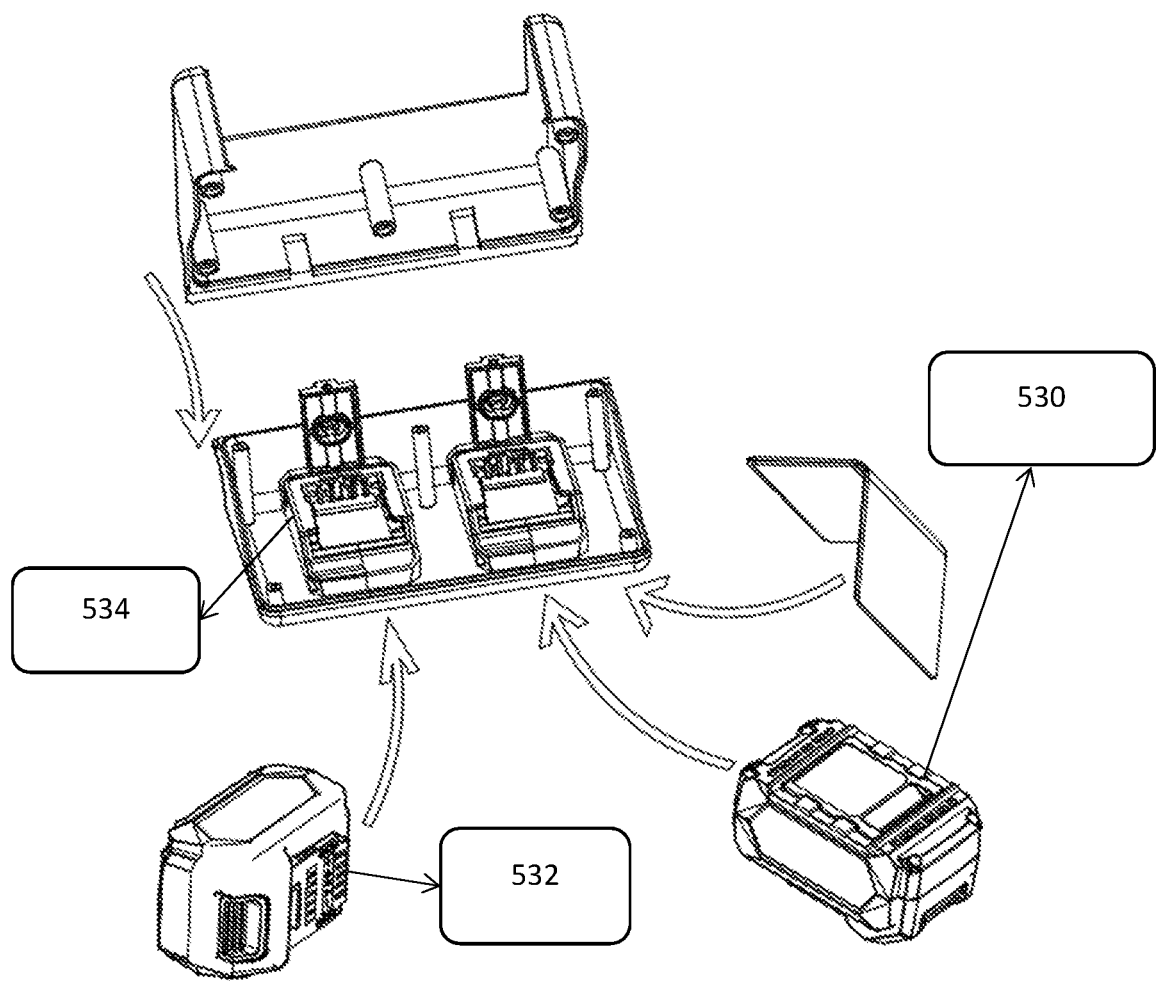
Figure 15B:
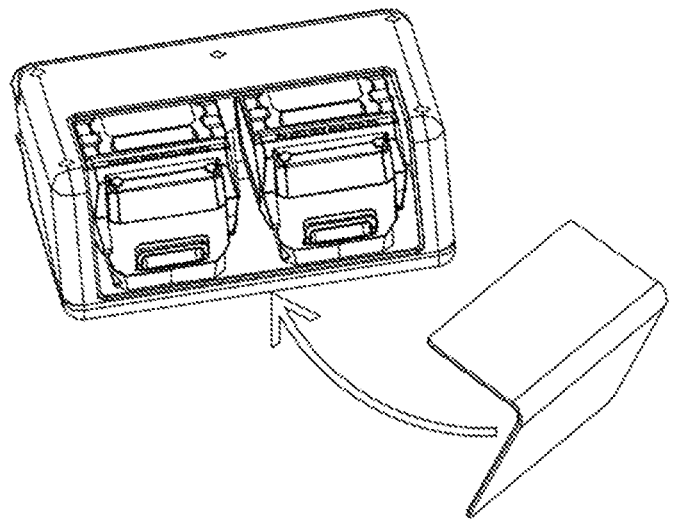

FIGS. 15A-15B provide perspective illustrations of an exemplary battery assembly, showing an electric bicycle of FIG. 14 with slide-type battery packs.

Figure 16A:
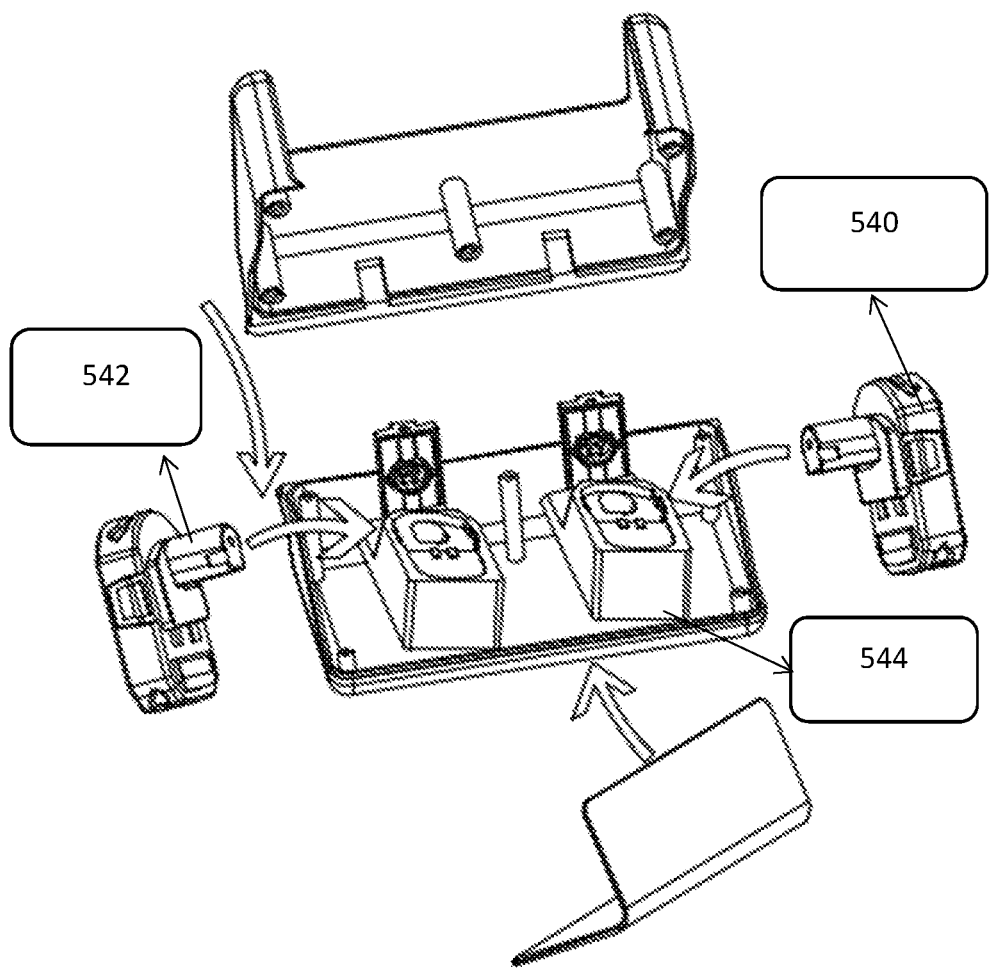
Figure 16B:
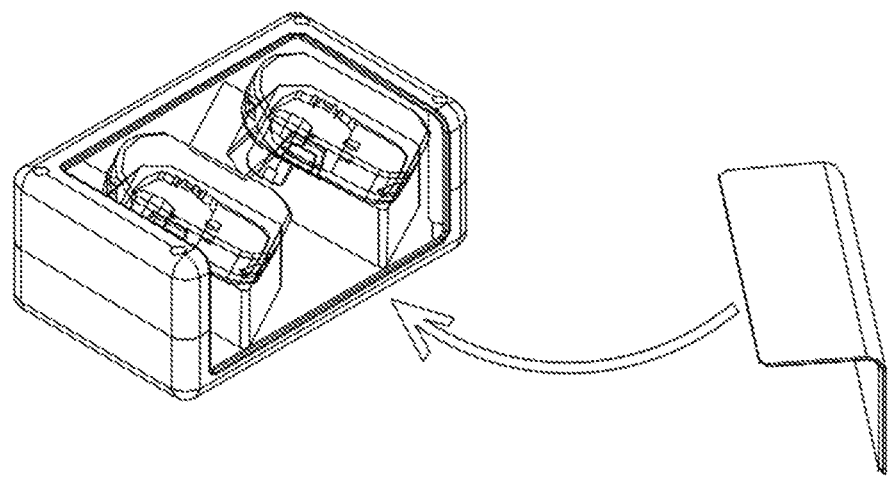

FIGS. 16A-16B provide perspective illustrations of an exemplary battery assembly, showing an electric bicycle of FIG. 14 with insert-type battery packs.

Figure 17:
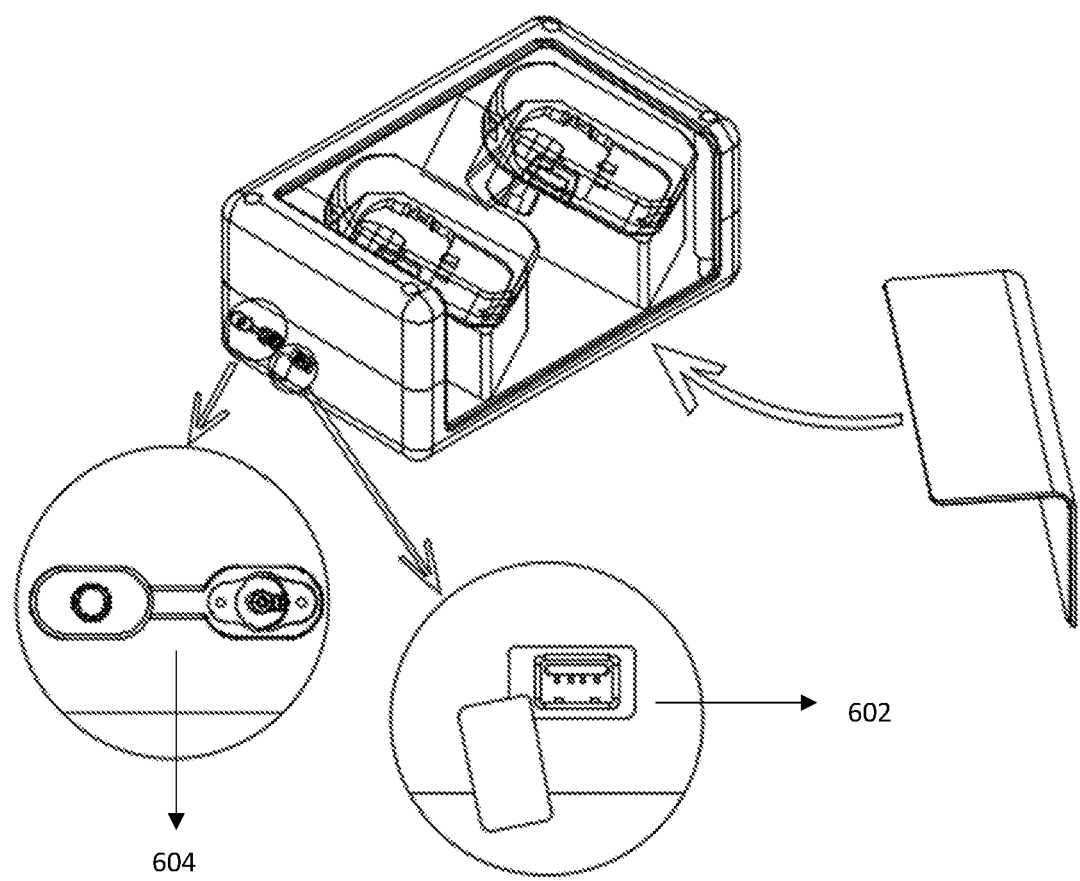

FIG. 17 provides a perspective illustration of an electric bicycle of this invention, including an AC charging port and at least one USB output port.

Figure 18A:
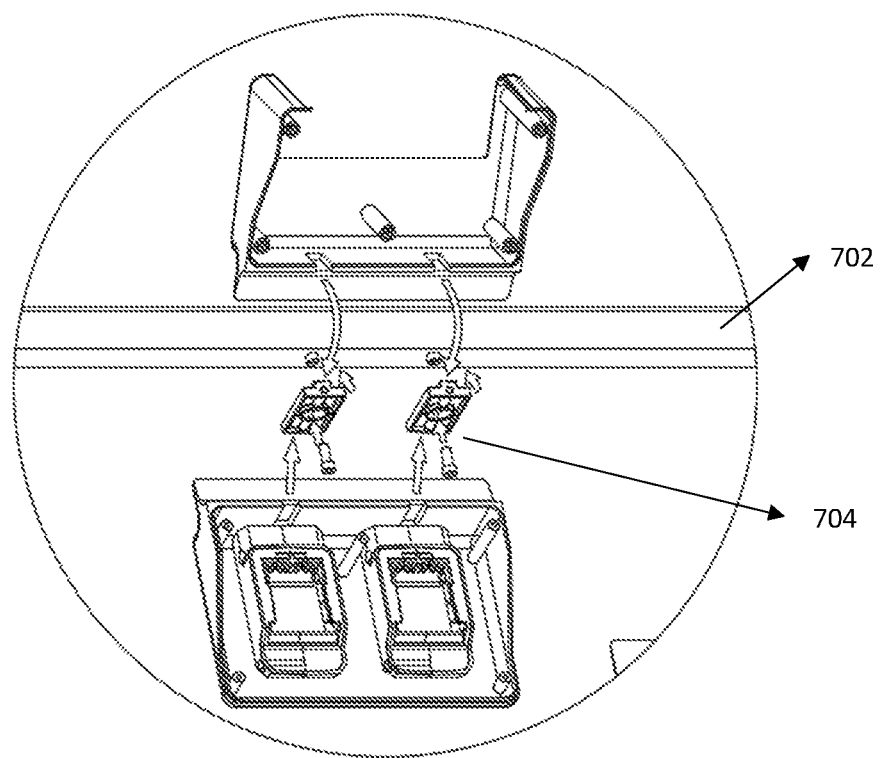
Figure 18B:
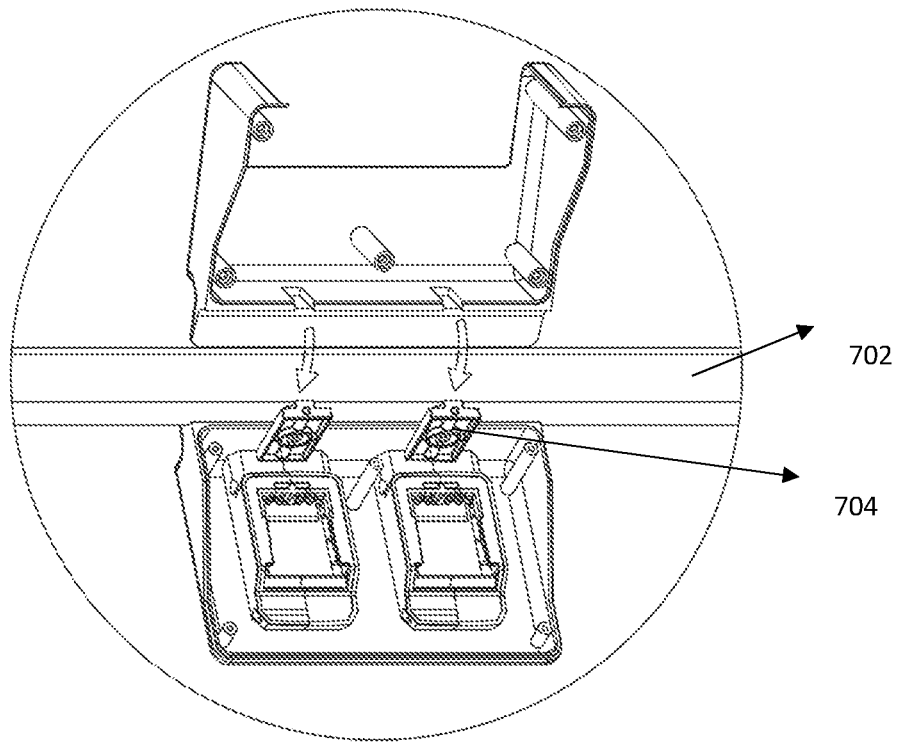

FIGS. 18A-18B provide perspective illustrations of an exemplary battery box mounted on a tube of a bicycle of this invention.

Figure 19A:
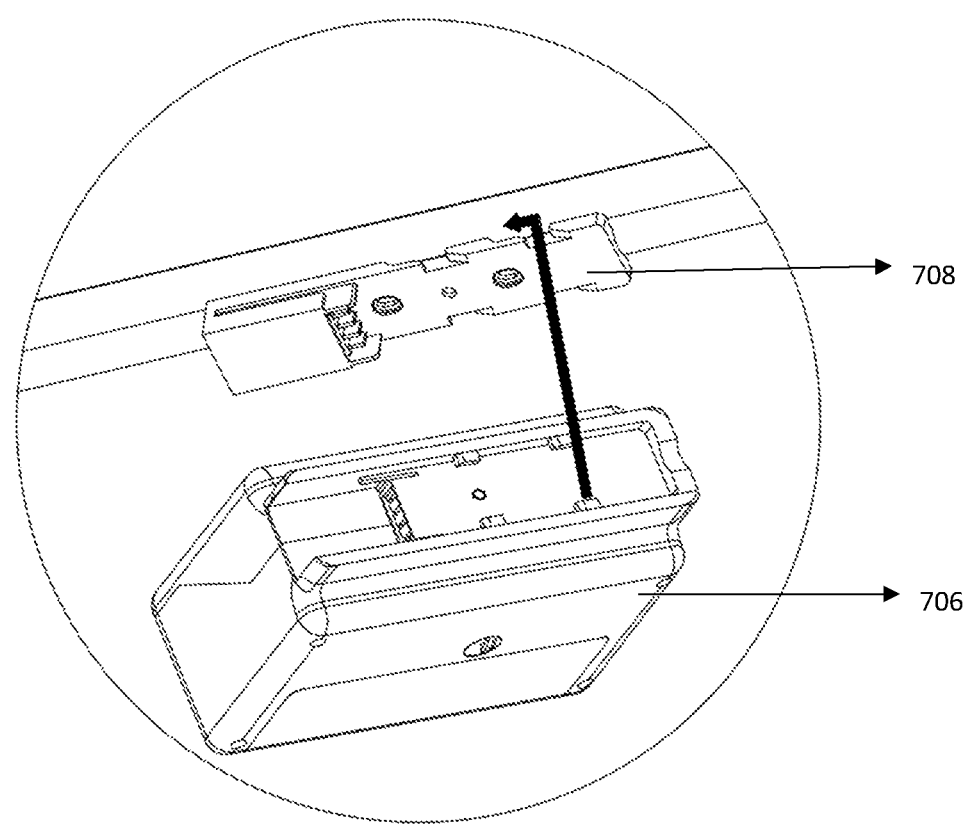

FIGS. 19A-18B provide perspective illustrations of an exemplary battery box that can be inserted into or removed from a receiver mounted on a tube of a bicycle of this invention.

DETAILED DESCRIPTION OF THE INVENTION

One aspect of this invention relates to a novel type of electric bicycles with detachable or removable battery pack (s). The electric bicycle utilizes a battery box to removably receive and hold one or more battery packs, particularly a variety types of lithium battery packs (e.g., slide-type or insert-type battery packs). The lithium battery packs utilized in the electric bicycles are the same types of battery packs used in other lithium electric tools. Therefore, such a battery pack is interchangeable between the bicycles of this invention and other common lithium electric tools. The present invention, therefore, allows the battery pack and the charger to be sharable with other lithium electric tools.

A key component of this invention provides varies preferred assemblies for the battery box that holds the detachable lithium battery packs. The battery box may be mounted via varies assemblies at different locations of the bicycle. For instance, the battery box may be mounted to the rear rack (e.g., under the rear rack and above the rear wheel), the front rack (e.g., under the front rack and above the front wheel); the down tube, the top tube, or the seat tube—with particularly designed shapes and assemblies. In addition, the battery box may include a removable cover to protect against water or dust, which can be tightly locked during the ride, and easily removed when the battery packs need to be taken out of the box. The battery box may also include a lock mechanism within the battery box to hold and lock the battery packs.

Another aspect of this invention provides a battery box with a separate charging port (e.g., A/C charging port). As such, when a battery pack needs to be charged, it can either easily be removed from the battery box and recharged by a standard charger, or be charged directly (without being taken out of the battery box) through the charging port.

A further aspect of this invention provides a battery box with one or more USB output ports. Accordingly, the electric bicycle can optionally become a power supply to charge another electric device via one of the USB output ports. Additionally, the USB output port can also provide data output on the battery box. For example, the USB output port can also be used through connecting a cellphone for the following functions: battery gauge display, speed display, travel range display, software upgrade, etc.

Still a further aspect of this invention provides a new type of electric bicycles with a battery box—which, together with the lithium battery packs mounted inside the battery box, can be removed from, or inserted into, a receiver mounted on a rack or tube (e.g., the down tube, the top tube, or the seat tube) of the bicycle. The battery box can have one or more USB output ports and/or one or more charging ports (e.g., A/C charging port). Accordingly, the whole battery box can be quickly removable from the bicycle by a user, and then used as a regular power bank. Also, there may be a lock mechanism to secure the battery box against theft.

Comparing with conventional electric bicycles, the novel type of the electric bicycles according to the present invention has at least the following advantages: (i) since the battery pack can be independently disassembled, single or multiple battery packs can be charged separately from the bicycles, thereby making battery charging more flexible and easier; (ii) the sharing of the lithium battery packs between the electric bicycles and other common lithium electric tools allows better use of the energy; and (iii) the battery replacement and maintenance become much easier and less expensive, without requiring a professional to do so.

Set forth below are several illustrations or examples of apparatus of this invention containing electric bicycles with detachable battery pack.

Figure 1A:
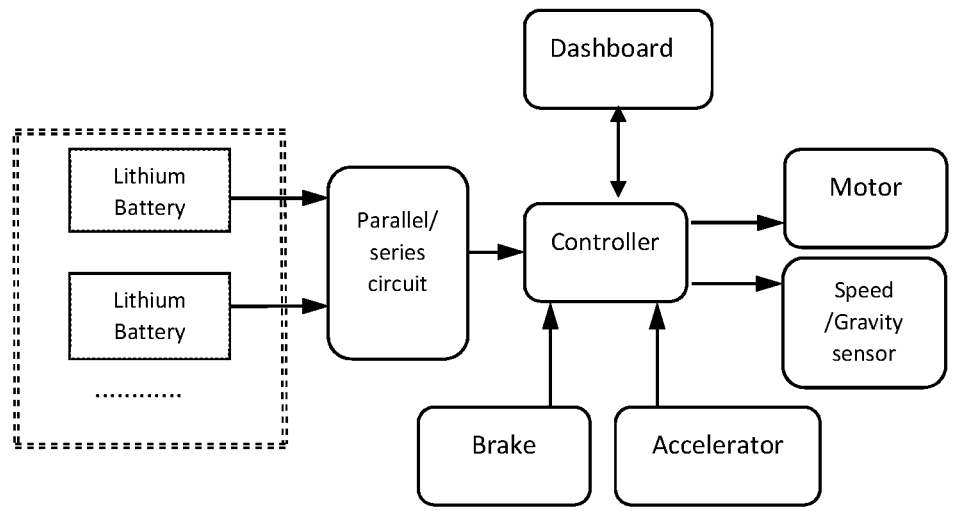
FIGS. 1A-1B illustrate a system diagram and operating principle of an electric bicycle of this invention.
Figure 1B:
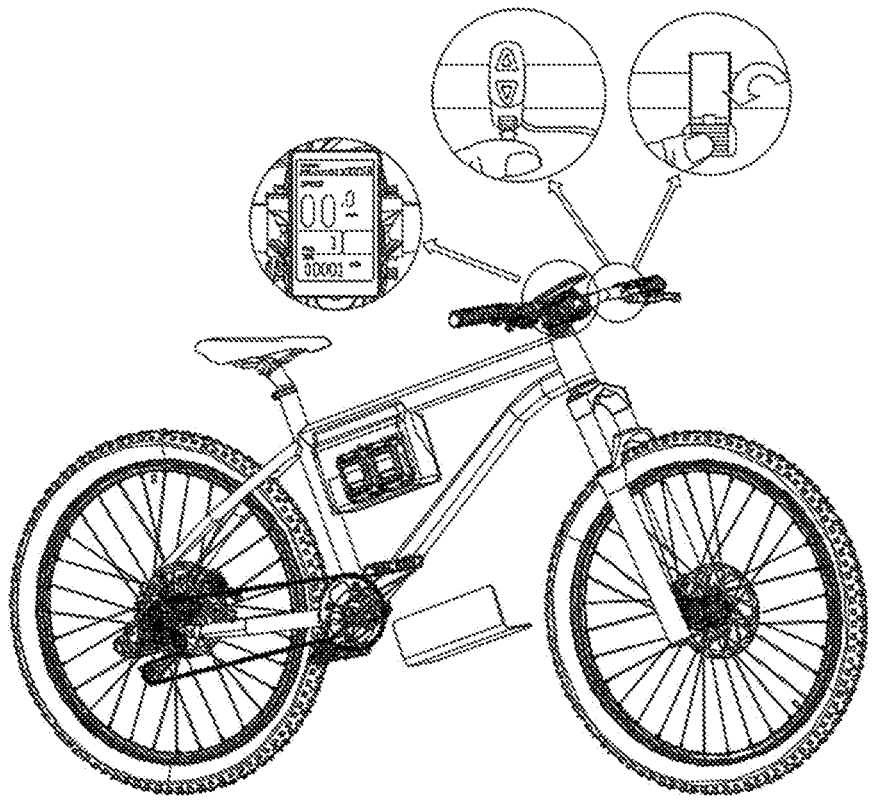

FIGS. 1A-1B illustrate an operating system and its operating principle of an electric bicycle of this invention. As shown in FIG. 1A, the system may include one or more detachable lithium battery packs connected to a controller via a circuit (e.g., parallel and/or series circuit), in which the controller is also connected to a brake, an accelerator, a dashboard, at least one speed and/or torque sensor, and a motor (or multiple motors)—e.g., via wired or wireless communications. A user riding the bicycle may use the dashboard to monitor and/or control the electric bicycle. As further shown in FIG. 1B, the dashboard, the brake, and the accelerator can be mounted on a handle bar of the bicycle, while the speed or torquesensor can be mounted inside the chainring; and the motor can be mounted on the front and/or rear wheels. After one or more battery packs are inserted or connected, they are configured to provide a power supply, for driving the motor through the controller, thereby powering the motor when the speed or torquesensing reaches a certain level. Also, the controller, the brake, the accelerator, and the dashboard communicate with one another via the circuit and form a feedback control system.

FIG. 2 is a perspective illustration of electric bicycle 10. Electric bicycle 10 includes brake 102, dashboard 104, handle bar 106, seat 108, rear rack 110, front wheel 112, rear wheel 114, chainring 116, battery box 118, and battery box cover 120. A speed and/or torquesensor can be mounted inside the chainring according to this invention. Battery box 118 is fixed to rear rack 110, e.g., being positioned under rear rack 110 and above rear wheel 114. Battery box 118 includes connector or socket(s) for removably receiving one or more detachable lithium battery packs. Particularly, the battery box may be designed to receive different types of battery packs, e.g., either slide-type or insert-type battery packs. Although the battery box may be able to receive and hold (e.g., lock) multiple battery packs, the operation of bicycle of this invention does not require the assembly of all the battery packs. The bicycles of this invention may still be powered and operated when only one battery pack is mounted inside the housing. In some embodiments, the battery box includes a spring to facilitate the removal or ejection of the battery (e.g., the slide-type battery packs). Electric bicycle 10 also includes removable cover 120 to cover the battery box and to protect against water and dust. The battery box according to the present invention may include a lock mechanism to hold and lock the battery packs. The size and shape of the battery box according to the present invention may vary based on the size, capacity and numbers of the lithium battery packs.

Such a battery system is configured to provide a power supply to power the electric motor, thereby providing mechanical power to at least one of the front and rear wheels, e.g., when the speed and/or torquesensing reaches a pre-determined level. The battery packs, together with the brake, accelerator, dashboard and controller, are configured to drive the electric motor and assist the control of the ride. Such battery packs can be easily removed and recharged by a standard charger for lithium battery packs. Notably, the lithium battery packs may also be used as a power source to other lithium electric tools. In other words, the battery pack is interchangeable between electric bicycle 10 and a separate lithium electric tool.

In some embodiments, a bicycle as descried in FIG. 2 is configured to utilize slide-type battery packs. As shown in FIGS. 3A-3B, the battery box includes a holder with sockets 130—to receive one or two slide-type battery packs 132. The battery pack includes plug interface 134 matching the corresponding socket, and can slide onto the holder, thereby connecting to the controller and providing a power to the electric motor. As described above, the battery packs of this invention may also be used for other common lithium electric tools. After the battery packs are inserted, a user may cover and close the battery box (by the battery box cover) to protect the battery from water or dust.

In some other embodiments, a bicycle as described in FIG. 2 is suitable for insert-type battery packs. As shown in FIGS. 4A-4B, the battery box includes a holder with two sockets 140, which are capable of removably receiving one or two insert-type battery packs 142. Each of the battery pack includes plug interface 144 for connecting to the socket, and can be inserted into the battery box. A battery box cover can also be provided for important protection.

FIG. 5 is another perspective illustration of an electric bicycle of this invention, in which a battery box for holding one or more detachable battery packs is mounted to the front rack of the bicycle. Electric bicycle 20 includes brake 202, dashboard 204, handle bar 206, seat 208, front rack 210, front wheel 212, rear wheel 214, chainring 216, battery box 218, and battery box cover 220. Battery box 218 is fixed to front rack 210, e.g., being positioned under front rack 210 and above front wheel 214. Battery box 118 includes connector or socket(s) for removably receiving one or more detachable lithium battery packs. The battery packs included by electric bicycle 20 can be either slide-type or insert-type battery packs, and are interchangeable between electric bicycle 20 and a common lithium electric tool.

As shown in FIGS. 6A-6B, the battery box 218 may include a holder with two connectors or sockets 230 to removably receive two slide-type battery packs 232. As shown in FIG. 6B, each battery pack includes plug interface 234, and may independently slide and be placed into the holder via their respective sockets. After the battery packs slide onto the sockets, cover 220 can be placed to cover and protect the battery box.

Alternatively, FIGS. 7A-7B show another battery assembly, which includes battery box (mounted to the front rack) for removably receiving two insert-type battery packs 240. As shown in FIG. 7B, each battery pack has plug interface 242, and may independently be inserted and plugged into the socket 244 in the battery box.

FIG. 8 is further perspective illustration of an electric bicycle of this invention, in which a battery box for holding one or more detachable battery packs is mounted to the down tube of the bicycle. As shown in FIG. 8, electric bicycle 30 includes brake 302, dashboard 304, handle bar 306, seat 308, front wheel 310, rear wheel 312, chainring 314, and battery box 316, which is mounted to down tube 318, and has a movably battery box cover 320. Battery box 316 is mounted to down tube 318, e.g., being positioned under and along the bottom side of down tube 318. The battery box is designed for receiving and holding either slide-type or insert-type battery packs.

As shown in FIGS. 9A-9B, the battery packs may be slide-type battery packs 330, which include plug interface 332, and can slide on to sockets 334 (e.g., via opposite directions) in battery box 316. Alternatively, as shown in FIGS. 10A-10B, battery box 316 may be designed to receive and hold insert-type battery packs 340. Each insert-type battery pack has plug interface 342, and the two insert-type battery packs may be plugged into the sockets 344 within the battery box, and placed as being opposite to each other. As shown in FIG. 10B, after the battery packs are inserted, a user may close the battery box by placing a cover.

Still a further embodiment of an electric bicycle of this invention includes a battery box mounted to the top tube of the bicycle. As shown in FIG. 11, electric bicycle 40 includes brake 402, dashboard 404, handle bar 406, seat 408, front wheel 410, rear wheel 412, chainring 414, and battery box 416—which is mounted to top tube 418, and has a movably battery box cover 420. Battery box 416 can be mounted to top tube 418, e.g., being positioned along and under top tube 418. The battery box is designed for receiving and holding either slide-type or insert-type battery packs.

FIGS. 12A-12B shows an exemplary battery assembly for the slide-type battery packs. For example, battery packs 430 include plug interface 432, and can slide on to sockets 434 in battery box 416. Alternatively, as shown in FIGS. 13A-13B, battery box 316 may be designed to receive and hold insert-type battery packs 440. The battery box includes sockets 444, which connect to the plug interface 442 of the battery packs, after those battery packs are inserted into the battery box.

Still in a further embodiment, an electric bicycle of this invention includes a battery box mounted to the seat tube of the bicycle. As shown in FIG. 14, electric bicycle 50 includes brake 502, dashboard 504, handle bar 506, seat 508, front wheel 510, rear wheel 512, chainring 514, and battery box 516—which is mounted to top tube 518. Battery box 516 has a movably battery box cover 520, which can be removed during the replacement or assembly of the battery packs. Battery box 516 can be mounted to (e.g., along) seat tube 418. For instance, the battery box may have a substantially trapezoid shape, in order to fit the angle space between the seat tube and the down tube.

The battery packs suitable for electric bicycle 50 can be either slide-type or insert-type battery packs. For instance, as shown in FIGS. 15A-15B, slide-type battery packs 530 can slide onto sockets 534 in the battery box, thereby connecting plug interface 532 to sockets 534. Alternatively, as shown in FIGS. 16A-16B, battery box 516 may receive and hold insert-type battery packs 540. The battery box includes sockets 544, for connecting to the plug interface 442 of the inserted battery packs.

According to the present invention, when the battery of the bicycle runs low (as can be indicated on the dashboard), a user can open a cover plate, remove the lithium battery pack(s) from the battery box by hand, and use a suitable charger to charge the battery pack or replace it for a fully charged battery pack, thereby continuing the ride.

In addition, in all the embodiments described for this invention, the electric bicycle may also include an AC charging port (604) and/or one or more USB output ports (602), e.g., as shown in FIG. 17. As such, the battery pack(s) can be charging directly without taking out from bicycle (by using the AC charging port), and also can optionally become a power supply to charge another electric device via one of the USB output ports. In addition, the USB output port 602 may provide data output on the battery box. For example, the USB output port can also be used through connecting a cellphone for, e.g., battery gauge display, speed display, travel range display, software upgrade, etc.

FIGS. 18A-18B illustrate an exemplary assembly showing how a battery box may be mounted on a tube of the bicycle in detail. Tube 702 can be the down tube, the top tube, or the seat tube of the bicycle. As shown in FIGS. 18A-18B, the battery box may be mounted on the tube via fastener 704 (e.g., with a rivet structure).

Figure 19B:
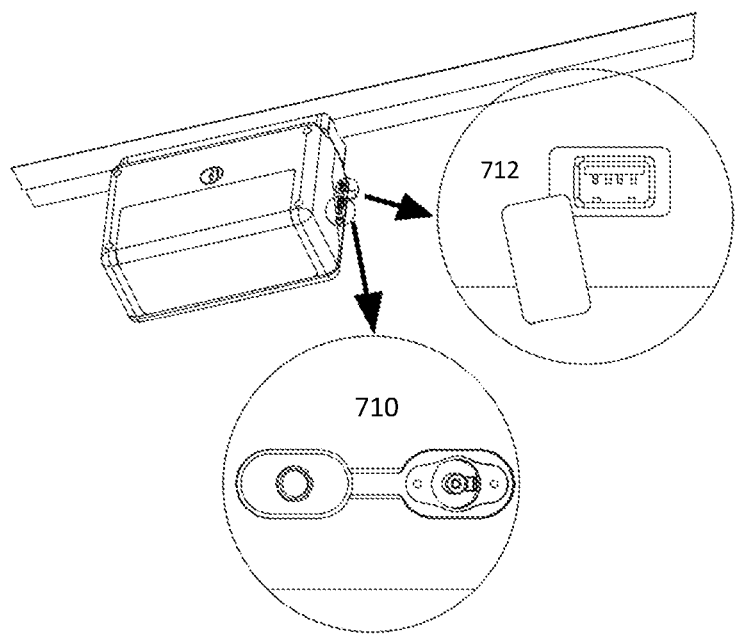

Alternatively, in all the embodiments described for this invention, the battery box, as a whole, can be designed to be easily removable from the tube or rack of the bicycle by a user. As shown in FIG. 19A, whole battery box 706 (possibly together with the inside lithium battery packs) can be inserted into or removed from receiver 708 mounted on a tube (e.g., the down tube, the top tube, or the seat tube) of the bicycle of this invention. As shown in FIG. 19B, the battery box can include A/C charging port 710 and/or USB output port 712. A lock mechanism can also be included to secure the battery box against theft. Accordingly, the whole battery box can be quickly removable from the bicycle by a user, and then used as a regular power bank, e.g., for other lithium electric tools.

Although specific embodiments of this invention have been illustrated herein, it will be appreciated by those skilled in the art that any modifications and variations can be made without departing from the spirit of the invention. The examples and illustrations above are not intended to limit the scope of this invention. Any combination of embodiments of this invention, along with any obvious their extension or analogs, are within the scope of this invention. Further, it is intended that this invention encompass any arrangement, which is calculated to achieve that same purpose, and all such variations and modifications as fall within the scope of the appended claims.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example of a generic series of equivalent or similar features.

Other Embodiments

It is to be understood that while the invention has been described in conjunction with the detailed description thereof and accompanying figures, the foregoing description and accompanying figures are only intended to illustrate, and not limit the scope of the invention, which is defined by the scope of the appended claims. Other aspects, advantages, and modifications are within the scope of the following claims. All publications referenced herein are incorporated by reference in their entireties.

What is claimed is:

1. An electric bicycle comprising:
   a body frame;
   a front wheel and a rear wheel;
   an electric motor configured to provide a mechanical power to at least one of the front and rear wheels; and a battery box configured to removably receive and hold one or more lithium battery packs, wherein the one or more lithium battery packs are configured to power the electric bicycle, and at least one lithium battery pack is capable of being used as a power supply of a separate lithium electric tool, wherein the battery box is mounted onto the body frame by a receiver, and the receiver removably receives and secures the battery box as a whole, and wherein the whole battery box is removable from the bicycle and able to be used as a regular power bank.

2. The electric bicycle of claim 1, wherein the receiver includes a lock mechanism to hold and lock the whole battery box.

3. The electric bicycle of claim 1, wherein the battery box includes a surface for holding the battery pack, by sliding the battery pack onto the surface in a direction parallel to the surface, or by inserting the battery pack into the surface in a direction perpendicular to the surface.

4. The electric bicycle of claim 1, wherein the body frame comprises a seat tube and a down tube, and the battery box is mounted to the seat tube alone.

5. The electric bicycle of claim 4, wherein the battery box has a substantially trapezoid shape, to fit the angle space between the seat tube and the down tube.

6. The electric bicycle of claim 1, wherein the body frame comprises a down tube, and the battery box is mounted to the down tube alone.

7. The electric bicycle of claim 6, wherein the battery box is positioned along the bottom side of the down tube.

8. The electric bicycle of claim 1, wherein the body frame comprises a top tube, and the battery box is mounted to the top tube alone.

9. The electric bicycle of claim 8, wherein the battery box is positioned along the bottom side of the top tube.

10. The electric bicycle of claim 1, wherein the body frame includes a front rack, and the battery box is mounted under the front rack.

11. The electric bicycle of claim 1, wherein the body frame includes a rear rack, and the battery box is mounted under the rear rack.

12. The electric bicycle of claim 1, wherein the battery box comprises sockets for plugging the battery pack.

13. The electric bicycle of claim 12, wherein the battery box further comprises a lock structure to hold and lock the battery pack.

14. The electric bicycle of claim 13, wherein the battery box comprises a spring to facilitate a removal of the one or more battery packs.

15. The electric bicycle of claim 1, further comprising a circuit for electrically connecting the battery packs to the electric motor.

16. The electric bicycle of claim 15, wherein the circuit is either a series circuit or a parallel circuit.

17. The electric bicycle of claim 1, further comprising a removable cover plate to cover the battery box.

18. An electric bicycle comprising:
a body frame;
a front wheel and a rear wheel;
an electric motor configured to provide a mechanical power to at least one of the front and rear wheels; and
a battery box configured to removably receive and hold one or more lithium battery packs, wherein the one or more lithium battery packs are configured to power the electric bicycle, and at least one lithium battery pack is capable of being used as a power supply of a separate lithium electric tool, wherein the battery box is mounted onto the body frame by a receiver, and the receiver removably receives and secures the battery box as a whole, and wherein the battery box includes a surface for holding the battery pack, by inserting the battery pack into the surface in a direction perpendicular to the surface.

19. An electric bicycle comprising:
a body frame;
a front wheel and a rear wheel;
an electric motor configured to provide a mechanical power to at least one of the front and rear wheels;
a battery box configured to removably receive and hold one or more lithium battery packs, wherein the one or more lithium battery packs are configured to power the electric bicycle, and at least one lithium battery pack is capable of being used as a power supply of a separate lithium electric tool; and
an AC charging port located on the battery box,
wherein the battery box is mounted onto the body frame by a receiver, and the receiver removably receives and secures the battery box as a whole.

20. An electric bicycle comprising:
a body frame;
a front wheel and a rear wheel;
an electric motor configured to provide a mechanical power to at least one of the front and rear wheels;
a battery box configured to removably receive and hold one or more lithium battery packs, wherein the one or more lithium battery packs are configured to power the electric bicycle, and at least one lithium battery pack is capable of being used as a power supply of a separate lithium electric tool; and
one or more USB output ports located on the battery box,
wherein the battery box is mounted onto the body frame by a receiver, and the receiver removably receives and secures the battery box as a whole.

21. The electric bicycle of claim 20, wherein the USB output port is on the battery box, and is configured to connect the battery box to a computing device for data output and display.

* * * * *